United States Patent
Brunner

(10) Patent No.: US 7,068,167 B2
(45) Date of Patent: Jun. 27, 2006

(54) OPTICAL SENSOR

(75) Inventor: Rolf Brunner, Eichenau (DE)

(73) Assignee: Leuze lumiflex GmbH & Co., KG, Fürstenfeldbruck (DE)

( * ) Notice: Subject to any disclaimer, the term of this patent is extended or adjusted under 35 U.S.C. 154(b) by 141 days.

(21) Appl. No.: 10/807,356

(22) Filed: Mar. 24, 2004

(65) Prior Publication Data

US 2004/0189468 A1    Sep. 30, 2004

(30) Foreign Application Priority Data

Mar. 24, 2003 (DE) ................................ 103 12 972

(51) Int. Cl.
   *G08B 13/18* (2006.01)
(52) U.S. Cl. ............. 340/555; 340/541; 250/222.1
(58) Field of Classification Search ......... 340/540–557, 340/619, 521, 539.23, 502–506, 517, 518, 340/531, 539; 250/222.1
   See application file for complete search history.

(56) References Cited

U.S. PATENT DOCUMENTS

| 3,972,021 | A | * | 7/1976 | Leitz et al. ............. 340/942 |
| 4,020,477 | A | * | 4/1977 | Holland .................. 340/502 |
| 4,302,750 | A | * | 11/1981 | Wadhwani et al. ...... 340/870.02 |
| 4,701,625 | A | * | 10/1987 | Kimura .................. 250/573 |
| 4,998,093 | A | * | 3/1991 | Benoit ................... 340/556 |
| 5,539,199 | A | * | 7/1996 | Ruckh et al. ............ 250/222.1 |
| 5,903,217 | A | * | 5/1999 | Stanczak et al. ......... 340/554 |
| 6,052,052 | A | * | 4/2000 | Delmonaco ............. 340/539.11 |
| 6,411,215 | B1 | * | 6/2002 | Shnier ................... 340/686.1 |
| 6,737,970 | B1 | * | 5/2004 | Wuestefeld et al. ...... 340/552 |
| 2003/0096593 | A1 | * | 5/2003 | Naboulsi ................ 455/411 |

FOREIGN PATENT DOCUMENTS

| DE | 44 05 376 C1 | 2/1995 |
| DE | 195 23 843 C1 | 1/1997 |
| DE | 197 21 105 A1 | 11/1998 |
| DE | 199 17 509 C1 | 5/2000 |
| DE | 100 01 017 A1 | 10/2000 |
| EP | 0 571 892 B1 | 12/1993 |
| EP | 0 571 913 B1 | 12/1993 |

* cited by examiner

*Primary Examiner*—Jeffery Hofsass
*Assistant Examiner*—Hoi C. Lau
(74) *Attorney, Agent, or Firm*—Venable LLP; Robert Kinberg; Jeffrey W. Gluck

(57) ABSTRACT

An optical sensor arrangement includes a transmitter that emits light rays and a receiver that receives light rays reflected from an object. A deflection unit deflects the transmitted light rays to periodically sweep across a monitoring range. An evaluation unit stores parameters of several safety zones that form respectively predetermined areas of the monitoring range. An object detection signal is generated in the evaluation unit in dependence on receiving signals at the receiver output, which object detection signal indicates whether or not an object is located within an activated safety zone. A communication interface is coupled to the evaluation unit and is operative for bi-directional data transmission with an external unit. At least one of the stored safety zones is activated by reading into the evaluation unit activation signals from the external unit via the communication interface.

16 Claims, 2 Drawing Sheets

OPTICAL SENSOR

CROSS-REFERENCE TO RELATED APPLICATION

This application claims the priority of German Patent Application No. 103 12 972.3, filed on Mar. 24, 2003, the subject matter of which is incorporated herein by reference.

BACKGROUND OF THE INVENTION

The invention relates to an optical sensor.

An optical sensor of this type is known from German patent document DE 199 17 509 C1. The optical sensor is used for detecting objects in a monitoring range and comprises a distance sensor with a transmitter for transmitting light rays and a receiver for receiving light rays, an evaluation unit for evaluating the signals received at the receiver and a deflection unit on which the transmitted light rays are deflected so that these periodically sweep across the monitoring range.

The dimensions of different safety zones, forming defined partial areas of the monitoring range, are stored in the evaluation unit of the optical sensor. However, the object detection does not occur in the complete monitoring range, but in a selected safety zone. For the safety zone selection, several switches are connected via respectively one feed line to an evaluation unit input, wherein each input is assigned a stored safety zone. Upon activation of a switch, a predetermined signal value is present at the assigned input which corresponds to an activation of this input. The safety zone assigned to this input is also activated along with the input, thus making it possible to detect the objects in this safety zone. For testing purposes, respectively one signal value is transmitted via an evaluation unit output to the feed lines. If no errors occur, this signal is then waiting at the respective evaluation unit input.

One essential advantage of this arrangement is that an error-safe selection of a specific safety zone can be made via a single input of the evaluation unit. The protection against errors in this case is ensured through emitting the signal values at the evaluation output, which are read back into and checked in the evaluation unit via the inputs.

An optical sensor of this type, however, has the disadvantage that a plurality of separate inputs must be provided for activating these safety zones, in particular for a higher number of stored safety zones In addition, this results in an undesirably high cabling expenditure for connecting the individual inputs of the optical sensor.

German patent document DE 195 23 843 C1 relates to a method for detecting objects in a monitoring range. According to this method, at least a first monitoring device is installed at the edge of an operating area, with the monitoring range positioned parallel to a plane for a driving lane within the operating area and a second monitoring device is arranged at an access ramp to the operating area which monitors a second monitoring range, positioned in a plane perpendicular to the operating area.

A reference object moving along a track is surveyed with the second monitoring range. From these measuring values, the contour edges of the range monitored by the first monitoring device is derived.

German patent document DE 44 05 376 C1 relates to a method for detecting objects located inside a monitoring range or objects penetrating this range, wherein a device having at least one transmitter, at least one receiver and an evaluation unit are used for the monitoring. A transmitting beam emitted by the transmitter transverse to the beam direction of the transmitter is guided inside the range. For different orientations of the transmitted beam, the distance between the device and the object are determined and the position measuring values are stored in the evaluation unit.

To detect objects having a specific contour, the position measuring values for the respective object are compared to desired values, which are computed in the evaluation unit from the object contour at a predetermined position in the range to be monitored. An object having the specific contour is considered detected if a minimum number N of the position measuring values drops by the desired values within at least one tolerance band T. The minimum number N of the position values and the dimensioning of the tolerance band T are selected in the evaluation unit in dependence on the position measuring values scattering.

German patent document DE 197 21 105 A1 relates to an opto-electronic sensor arrangement with a light transmitter for transmitting a light bundle to a monitoring range, a light receiver for receiving a light bundle, formed by transmitting light that is reflected by an object located in the monitoring range in the direction of the light receiver, wherein the receiving light bundle is at a changeable beam angle to the transmitting light bundle in dependence on the distance between the object and the sensor. The opto-electronic sensor arrangement further includes a control and evaluation unit for processing the output signal from the light receiver. The light receiver is provided with a multi-element light sensor comprising at least four individual sensing elements, which are arranged adjacent to each other, such that the receiving light bundle hits different sensing elements in dependence on the beam angle.

With a network of switches, sums and/or differences of the output signals of the multi-element light sensor can be formed in different ways.

German patent document DE 100 01 017 A1 relates to a reflex light scanner for detecting an object in a monitoring field, comprising at least one light transmitter, at least n>2 photodiodes, a transmitting optic, a receiving optic and an evaluation unit, wherein the photodiodes are interconnected to form a photodiode line and are parallel connected relative to each other.

The switching distance can be adjusted particularly easy and fast owing to the fact that the photodiodes are connected on the one hand to a joint potential and that adjacent photodiodes are, on the other hand, respectively connected to each other via an opener, that n−1 openers are provided for n photodiodes and that the first photodiode is connected to a first channel of the evaluation unit and the $n^{th}$ photodiode is connected to a second channel of the evaluation unit.

European patent document EP 0571 913 B1 relates to a system for recording optical targets. To detect the optical targets, patterns are defined within the picture to be evaluated, which are respectively correlated with parts of the picture in a correlating device. The selection of the patterns occurs via an evaluation unit and in dependence on specific picture features.

European patent document EP 0571 892 B1 relates to an image-detection system for detecting the images of labels. This system is provided with two target processing units by means of which target detection signals are generated. These units are connected to a detection device for adjusting the generated target detection signals. Finally, the orientation of the label image is determined in an additional processing unit.

SUMMARY OF THE INVENTION

It is an object of the present invention to provide an optical sensor of the aforementioned type, for which a secure selection of different safety zones can be made with the lowest possible expenditure.

The above and other objects are accomplished according to the invention by the provision of An optical sensor arrangement, comprising: a transmitter that emits light rays; a receiver that receives light rays reflected from an object and having an output producing receiving signals; a deflection unit to deflect the transmitted light rays to periodically sweep across a monitoring range; an evaluation unit coupled to the transmitter and the receiver unit and storing parameters of several safety zones that form respectively predetermined areas of the monitoring range, wherein an object detection signal is generated in the evaluation unit in dependence on the receiving signals at the receiver output, which object detection signal indicates whether or not an object is located within an activated one of the safety zone; and a communication interface coupled to the evaluation unit and operative for bi-directional data transmission with an external unit, wherein at least one of the stored safety zones is activated by reading into the evaluation unit activation signals from the external unit via the communication interface.

One essential advantage of the optical sensor according to the invention is that individual safety zones can selectively be chosen via a communication interface from a plurality of different safety zones Stored in the evaluation unit. The circuitry and cabling expenditure for activating the safety zones can thus be kept at a minimum.

The communication interface in particular can be an interface for transmitting parameter values. The expenditure for circuitry and cabling is reduced even further as a result of this multiple use of the interface.

The parameter values which are read into and stored in the evaluation unit include, for example, the contours of the individual safety zones within which an object is to be detected.

The communication interface in an exemplary embodiment is designed as a serial interface, e.g. in the form of a RS 232 or a RS 485 interface. Alternatively, the communication interface can also be a bus interface and preferably a field bus interface, e.g. a process data highway interface, wherein a secure field bus interface is preferably used. The communication interface can furthermore also be an ethernet interface or the like.

In general, the communication interface thus functions as a universal interface for connecting to external units such as control systems and bus systems. With this interface and using universal standard data transmission protocols, the safety zone where the objects are to be detected can be activated at predetermined moments in the optical sensor. The data transmission via the communication interface in that case can be wire-connected or non-contacting, for example by using optical transmission or radio transmission.

An activation signal with a specific identification characteristic for the safety zone is transmitted for activating a safety zone.

In particular for the case where the optical sensor is used for the protection of persons, it is necessary to ensure an error-free activation of the safety zones to maintain the required safety level.

With a typical single-channel design for the communication interface hardware, the necessary safety level is reached with the aid of the software for transmitting data via the communication interface.

Checksum techniques, which are known per se, can be used for transmitting the activation signals, so as to uncover possible transmission errors and ensure a secure data transmission.

With a particularly advantageous embodiment, a feedback signal is generated in the evaluation unit after an activation signal has been read by an external unit into the evaluation unit of the optical sensor to achieve the required safety level. This feedback signal must be recorded by the external unit within a specified time interval following the transmission of the activation signal. An error message is generated if this feedback signal is not recorded correctly or not within the specified time. Following this error message, the activation signal is preferably transmitted again until it is received correctly in the evaluation unit. In the simplest case, the feedback signal itself consists of an acknowledgment of the activation signal (handshake), indicating that the activation signal was received correctly. It is particularly advantageous if the feedback signal provides feedback that the safety zone has been activated. In this way, a check can be run in the external unit to determine whether or not the correct safety zone was activated in the evaluation unit.

BRIEF DESCRIPTION OF THE DRAWINGS

The invention is explained in the following with the aid of the drawings.

DETAILED DESCRIPTION OF THE INVENTION

Figure 1:
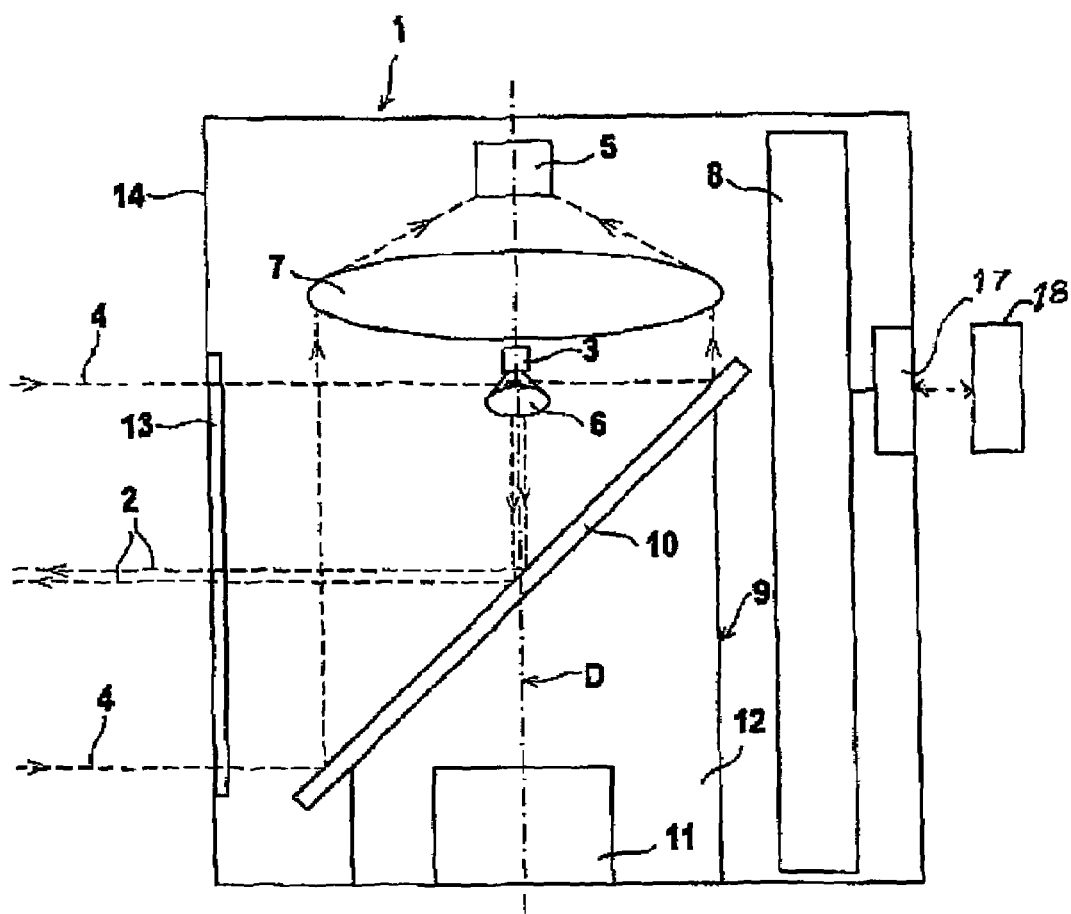
FIG. 1 is a schematic representation of an exemplary embodiment of the optical sensor

FIG. 1 shows an exemplary embodiment of an optical sensor 1 for detecting objects. The optical sensor 1 comprises a distance sensor element with a transmitter 3 for emitting light rays 2 and a receiver 5 for receiving light rays 4. The transmitter 3 preferably consists of a laser diode followed by a transmitting optic 6 for generating the light rays 2. The receiver 5, for example, is a photodiode with a receiving optic 7 arranged in front.

The distance can thus be measured on the basis of the phase measuring principle. For this, the laser diode operates in the continuous wave (CW) mode, wherein an amplitude modulation is imprinted on the transmitted light rays 2. On the receiving side, the distance information is determined through a comparison of the phase positions for the emitted light rays 2 and the received light rays 4, which are reflected by the object and impinge on receiver 5.

An evaluation unit 8, to which the transmitter 3 and the receiver 5 are connected via feed lines that are not shown in FIG. 1, is used for the evaluation, i.e., to carrying out the distance measuring algorithm. In an exemplary embodiment, evaluation unit 8 may comprise a micro-controller.

The distance can alternatively also be measured with the pulse-transit time method, for which the transmitter 3 emits short transmitting light pulses. The distance information in that case is determined through directly measuring the transit time of a transmitted light pulse to an object and back to the receiver 5.

The transmitted light rays 2 and the received light rays 4 are guided over a deflection unit 9. The deflection unit 9 is provided with a deflection mirror 10, which is positioned on a base 12 that is driven by a rotating motor 11. The deflection mirror 10 thus rotates with a predetermined speed around a vertical axis of rotation D. The transmitter 3 and the receiver 5 are arranged in the axis of rotation D, above the deflection mirror 10.

The deflection mirror 10 is inclined at a 45° angle relative to the axis of rotation D, so that the transmitted light rays 2, which are reflected at the mirror 10, leave the optical sensor 1 in a horizontal direction. In the process, the transmitted light rays 2 pass through an exit window 13, arranged in a front wall of housing 14 for the optical sensor 1. The housing 14 has an essentially cylindrical design, wherein the exit window 13 extends over an angular region of 180°. The transmitted light rays 2 accordingly can sweep across a horizontally positioned monitoring range 15 in which objects can be detected, as shown in particular in FIG. 2. The received light rays 4 which are reflected back by the objects pass in a horizontal direction through the exit window 13 and are guided over the deflection mirror 10 to the receiver 5. The border for the monitoring range 15 is predetermined by the maximum scanning distance for the distance sensor.

To detect the position of an object, the momentary angle position of deflection unit 9 is continuously detected with an angle transmitter that is connected to the evaluation unit 8 and is not shown herein. The position of an object is determined in the evaluation unit 8 from the angle position and the distance value recorded in this angle position.

Optical sensors 1 of this type are used in particular also in the area of protection of persons, wherein the evaluation unit a has a redundant design to meet safety-technical requirements.

Figure 2:
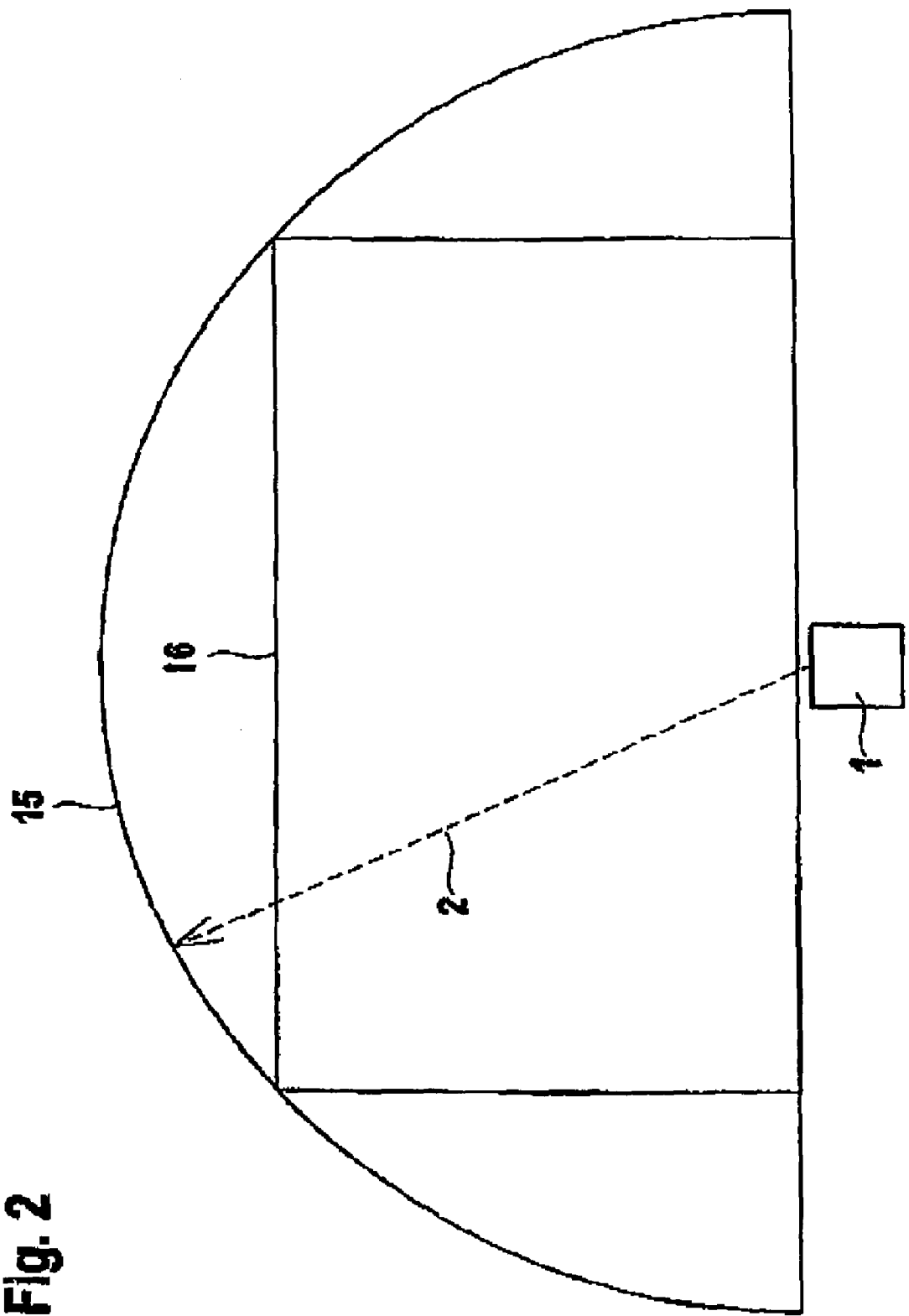
FIG. 2 is a schematic representation of a safety zone monitored by the optical sensor shown in FIG. 1.

From a safety-technical aspect, the detection of objects and persons typically does not occur over the complete monitoring range 15 that is scanned with the transmitted light rays 2, but within a limited safety zone 16. FIG. 2 shows one example of a safety zone 16 of this type, wherein the safety zone 16 in this case is a rectangular, planar surface. An object report is generated as soon as an object or a person enters the safety zone. This object report is transmitted as binary object detection signal via a switching output that is connected to the evaluation unit 8 and is not shown herein. This binary object detection signal can be used to shut down a machine for which the surrounding area is monitored by the optical sensor 1.

Many safety-technical applications require that the objects be detected at different times in differently configured safety zones 16.

For example, if the optical sensor 1 is attached to the front of a vehicle, in particular a transport vehicle without driver to monitor the area in front, it makes sense it the size of the safety zone 16 depends on the vehicle speed. For this, a large safety zone 16 is typically required for high speeds to record objects that are still far away, whereas a smaller safety zone 16 may be sufficient for slower speeds.

Several safety zones 16 with different contours and dimensions are therefore stored in the evaluation unit 8 to adapt the sensor 1 to time-dependent application-specific requirements of this type.

The geometric dimensions of the safety zones 16 are preferably read via a communication interface 17 as parameter values into the evaluation unit 8 before the optical sensor 1 becomes operational. The communication interface 17 forms an interface for the bidirectional data transmission between the optical sensor 1 and an external unit 18.

Examples of the communication interface 17 that may be used for implementing the invention include a serial interface, for example a RS 232 or a RS 485 interface. Depending on the area of use of the optical sensor 1, the communication interface 17 can also be a bus interface. In particular, the communication interface 17 can be designed as field bus interface for connecting the optical sensor 1 to a process data highway or the like. The communication interface 17 in general can also be an ethernet interface or a similar interface.

For the present case, the communication interface 17 of the optical sensor 1 is coupled via a communication path 19 to external unit 18 so that a transmission of the data occurs via the communication interface 17. In general, the data transmission can be a wire connection or can be non-contacting, for example by transmitting optical signals or radio signals via the communication interface 17.

Activation signals are transmitted in addition to the parameter values via the communication interface 17, wherein individual safety zones 16 can be selected with these activation signals and via the external unit in the optical sensor 1 from the safety zones stored in the evaluation unit 8. For this, the object detection in the optical sensor 1 occurs only within the respectively activated safety zones 16.

In principle, several safety zones 16 can be activated simultaneously. For the present case, the generating of the activation signals and the corresponding evaluation in the evaluation unit 8 ensure that only one safety zone 16 that is stored in the evaluation unit 8 is activated at any point in time during the operation of the optical sensor 1. Thus, an object detection occurs at any point in time within a clearly defined safety zone 16.

An activation signal that is read by the external unit via the communication interface 17 into the evaluation unit 8 contains an identification characteristic which is clearly assigned to one of the stored safety zones 16. For example, an unambiguous code can respectively be assigned to each safety zone 16 that is stored in the evaluation unit 8. The identification characteristic for the activation signal contains the code for the safety zone 16 to be activated. The activation signal that is read in is decoded in the evaluation unit 8 and the safety zone 16 that corresponds to the respective code is then activated.

Since only one safety zone 16 is activated for this embodiment during the complete operating phase of the optical sensor 1, the currently activated safety zone 16 is deactivated at the same time in the evaluation unit 8 as a new safety zone 16 is activated in dependence on the activation signal that is read in. Thus, reading in the activation signal causes a safety zone switch.

If the optical sensor 1 is used in the area of protection of persons, it must meet the safety level required for this use. For this, the optical sensor 1 and in particular the evaluation unit 8 typically have a redundant design.

To maintain the required safety level, it is furthermore necessary that the safety zone switch occurs in the same way without errors.

Since the communication interface 17 typically has a single-channel design, the software in this case is correspondingly configured for the data transmission via the communication interface 17.

A feedback signal is generated in the evaluation unit 8 in response to an activation signal to ensure the safety level, wherein this signal is sent via the communication interface 17 back to the external unit 18 The data transmission occurs such that following the transmission of an activation signal, a corresponding feedback signal must be recorded in the external unit 18 during a predetermined time window. If, following the transmission of the activation signal, the feedback signal is not received or not correctly received in the external unit 18 within this time window, an error message is generated and the data transmission is rejected as invalid. In that case, the data transmission is restarted by the external unit 18, so that the activation signal can again be read into the evaluation unit 8.

The feedback signal for the first embodiment consists of an acknowledgment confirming that the activation signal was received. Based on this acknowledgment, a check can be run in the external unit 16 to determine whether the activation signal was received correctly in the optical sensor 1 The data transmission route via the communication interface 17 can be checked with the aid of this feedback signal.

According to an advantageous second embodiment, the activation of the new safety zone 16 in the evaluation unit 8 is signaled by the feedback signal. In that case, the external unit 18 not only can check the data transmission route via the communication interface 17, but can also control the function of the evaluation unit 8 during the safety zone switch.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An optical sensor arrangement, comprising:
   a transmitter that emits light rays;
   a receiver that receives light rays reflected from an object and having an output producing receiving signals;
   a deflection unit to deflect the transmitted light rays to periodically sweep across a monitoring range;
   an evaluation unit coupled to the transmitter and the receiver unit and storing parameters of several safety zones that form respectively predetermined areas of the monitoring range, wherein an object detection signal is generated in the evaluation unit in dependence on the receiving signals at the receiver output, which object detection signal indicates whether or not an object is located within an activated one of the safety zones; and
   a communication interface coupled to the evaluation unit and operative for bi-directional data transmission with an external unit, wherein at least one of the stored safety zones is activated by reading into the evaluation unit activation signals from the external unit via the communication interface.

2. The optical sensor according to claim 1, wherein the communication interface is a serial interface.

3. The optical sensor according to claim 1, wherein the communication interface is a bus interface.

4. The optical sensor according to claim 1, wherein a wire transmission of data occurs via the communication interface.

5. The optical sensor according to claim 1, wherein the communication interface is adapted for a non-contacting data transmission with the external unit.

6. The optical sensor according to claim 5, wherein the data are transmitted in the form of optical signals.

7. The optical sensor according to claim 5, wherein the data are transmitted in the form of radio signals.

8. The optical sensor according to claim 1, wherein the activation signals are supplied to the evaluation unit via the communication interface and an error-free data transmission.

9. The optical sensor according to claim 8, wherein the activation signals include an identification characteristic that is respectively assigned to one stored safety zone.

10. The optical sensor according to claim 9, wherein the evaluation unit emits a feedback signal via the communication interface in response to an activation signal.

11. The optical sensor according to claim 10, wherein an error message is generated in an external unit that is connected to the communication interface in the event that no feedback is received within a predetermined time interval for the transmitted activation signal.

12. The optical sensor according to claim 10, wherein the feedback signal functions to acknowledge an activation signal.

13. The optical sensor according to claim 10, wherein the feedback signal indicates the activation of a safety zone in the evaluation unit, which occurred in dependence on the assigned activation signal.

14. The optical sensor according to claim 1, wherein activated safety zones are switched by means of the activation signals.

15. The optical sensor according to claim 1, further disposed to enable transmission of parameter data via the communication interface.

16. The optical sensor according to claim 15, wherein the contours of the safety zones form-the parameter data.

* * * * *